March 22, 1966  H. KROEPER ET AL  3,242,227
PROCESS FOR THE SEPARATION OF CONJUGATED DIOLEFINES
FROM ALLENES AND ACETYLENES
Filed Nov. 21, 1962
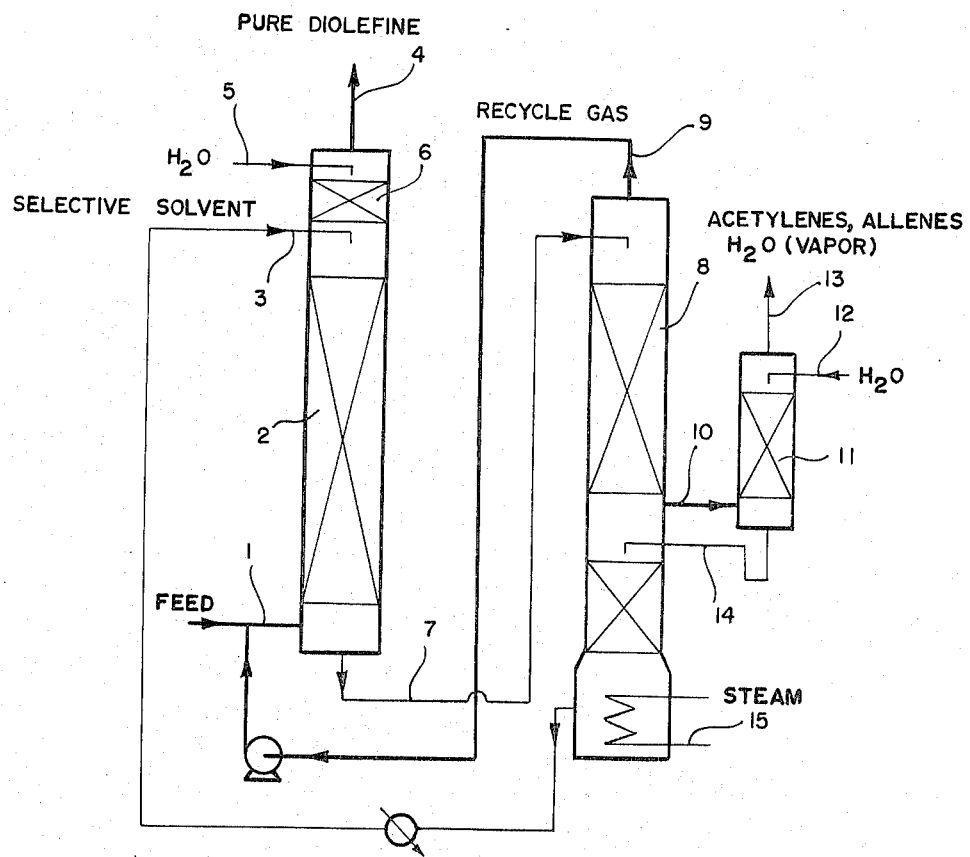
INVENTORS:
HUGO KROEPER
ULRICH WAGNER
HANS-MARTIN WEITZ
ATT'YS 3,242,227
PROCESS FOR THE SEPARATION OF CONJUGATED DIOLEFINES FROM ALLENES AND ACETYLENES
Hugo Kroeper, Heidelberg, and Ulrich Wagner and Hans-Martin Weitz, Ludwigshafen (Rhine), Germany, assignors to Badische Anilin- & Soda-Fabrik Aktiengesellschaft, Ludwigshafen (Rhine), Germany
Filed Nov. 21, 1962, Ser. No. 239,241
Claims priority, application Germany, Nov. 24, 1961, B 64,897, B 64,898, B 64,899
7 Claims. (Cl. 260—681.5)

This invention relates to a process for the separation of conjugated diolefines from allenes and acetylenes. More specifically, the invention relates to the separation of 1,3-butadiene from 1,2-butadiene, 1-butyne and 2-butyne or of isoprene from $C_5$-hydrocarbons showing the same ratio of carbon atoms to hydrogen atoms as isoprene.

Pyrolitic methods are being increasingly used for the production of diolefines, in particular of 1,3-butadienes and isoprene. Gas mixtures are obtained which contain, besides the desired conjugated diolefines, other unsaturated compounds, among them allenes and acetylenes of the same empirical formula as the conjugated diolefines and showing the same ratio of carbon atoms to hydrogen atoms. For polymerization of 1,3-butadiene or isoprene with organometallic catalysts, however, conjugated diolefines must be free from allenes and acetylenes of the same empirical formula as 1,3-butadiene or isoprene. In the prior art methods of separating the gas mixtures the acetylenes are as a rule first removed so that they do not cause any disturbance in the subsequent isolation and purification of the 1,3-butadienes or isoprene. Other methods first jointly separate the diolefines and acetylenes from the gas mixture, the acetylenes being removed in a second step. These methods are comparatively expensive. In the prior art methods in which the acetylenes are separated prior to the isolation of the diolefine various procedures are used. For example, the acetylenes have been selectively hydrogenated. By this method it is, however, impossible to avoid a small part of the conjugated diolefine also being hydrogenated and thus lost. Moreover, allenes remain unchanged or are hydrogenated to monoolefines or alkanes. In another prior art method, the acetylenes are removed by means of selective extractants. By using ammoniacal copper salt solutions mainly acetylenes with terminal acetylene bonds are removed, while allenes and acetylenes with non-terminal acetylene groups are only partly removed. Furthermore the diolefine to be purified is partly dissolved and must be recovered in a separate process step. Moreover, copper-acetylene compounds are formed which are liable to decompose explosively.

It is an object of the present invention to provide a process for the separation of 1,3-butadiene and isoprene from allenes and acetylenes of the same empirical formula as 1,3-butadiene or isoprene. It is a further object of the invention to provide a process for the separation of 1,3-butadiene or isoprene from allenes and acetylenes showing the same ratio of carbon atoms to hydrogen atoms as $C_4H_6$ or $C_5H_8$. It is another object of the invention to provide a process for the separation of 1,3-butadienes and isoprene from acetylenes with non-terminal acetylene groups. Yet a further object of the invention is to provide suitable selective solvents for the separation of 1,3-butadiene and isoprene from gas mixtures containing the same, in addition to allenes and/or acetylenes of the same empirical formula, as impurities.

These and other objects are achieved by selective extraction of the said allenes and acetylenes from the gas mixtures by passing the 1,3-butadiene or isoprene contaminated by allenes or acetylenes of the same empirical formula countercurrently to a stream of furfurol (furfural), acetonitrile, lactams, N-alkyl substituted lactams, N-hydroxyalkyl substituted lactams, lactones, or N-acylated cyclic amines with 4 or 5 carbon atoms and 1 nitrogen atom in the ring. The process may be used for the separation of conjugated 1,3-dienes with 4 to 5 carbon atoms from a gas mixture which contains, besides the said 1,3-dienes, small amounts of alkynes and 1,2-alkadienes with 4 or 5 carbon atoms. For example, the process lends itself to the purification of 1,3-butadiene, which has been obtained by thermal treatment of hydrocarbons and suitable fractionation and which contains small amounts, e.g., up to a total of 5% by weight, of 1,2-butadiene, 1-butyne and 2-butyne, and also small amounts, e.g., up to 1%, of $C_5$-compounds similar to 3-methyl-butyne or 3-methyl-1,2-butadiene. The process is furthermore suitable for the purification of isoprene which contains up to 5% by weight of 3-methyl-1-butyne or 3-methyl-1,2-butadiene and/or small amounts, e.g., up to 1% by weight, of unsaturated $C_4$-hydrocarbons such as 1-butyne, 2-butyne, or 1,2-butadiene.

Suitable selective extractants are furfurol, acetonitrile or saturated heterocyclic compounds having 5 or 6 ring members with an oxygen or nitrogen atom as hetero atom and containing a carbonyl group in vicinal position to the hetero atom either in the ring or outside it. Suitable heterocyclic compounds may be saturated lactones with 4 or 5 carbon atoms in the ring, saturated lactams with 4 or 5 carbon atoms in the ring, N-alkyl substituted or N-hydroxyalkyl substituted lactams with 4 or 5 carbon atoms in the ring and 1 to 4 carbon atoms in the alkyl or hydroxylalkyl, or N-acylated heterocyclic saturated amines having the N-atom in the ring, and containing 4 or 5 carbon atoms in the heterocyclic ring and 1 to 3 carbon atoms in the N-acyl group. The heterocyclic compounds may also be substituted at the methylene groups of the ring by 1 or 2 alkyl groups, e.g., methyl, ethyl, isopropyl or butyl groups. Examples of heterocyclic compounds of the type mentioned are: butyrolactone, valerolactone, pyrrolidone (butyrolactam), piperidone (valerolactam), N-methylpyrrolidone, N-butylpyrrolidone, N-($\beta$-hydroxyethyl)-pyrrolidone, N-formylpyrrolidine, N-acetylpyrrolidine, and also formyl piperidine and acetopiperidine, as well as $\alpha$-methylbutyrolactone, $\beta$-methylpyrrolidone, $\alpha$-methylpiperidone, $\alpha,\gamma$-dimethylpyrrolidone and $\alpha,\beta$-dimethyl-N-methylpyrrolidone. The preferred solvents are N-methylpyrrolidone, furfurol and acetonitrile.

The selective solvent may be used in pure form or with an addition of up to 25%, with reference to the mixture, of water. Addition of water increases selectivity. It is preferred to use solvents which contain 5 to 10% by weight of water with reference to pure solvent. If acetonitrile is used, the preferred range of water content in the acetonitrile lies at 5 to 15% by weight. Furfurol may be used even if saturated with water, i.e., having a water content of 4.5% by weight.

It is known in the art that the solvents mentioned are suitable for the separation of unsaturated hydrocarbons of different degrees of unsaturation. It is highly surprising, however, that hydrocarbons with the same C-H ratio in the molecule or the same degree of unsaturation can also be separated by means of these solvents.

The process may be carried out by passing the gas mixture to be purified countercurrently to a liquid stream of one of the said selective solvents, i.e., by scrubbing from the vapor phase. Any conventional method may be used. The process may also be carried out as a liquid-liquid extraction.

Depending on the procedure desired, the process may be carried out at a temperature as low as −10° C., the hydrocarbons then being liquid, or at a higher temperature, but not above 150° C. The process may be carried out at atmospheric pressure or at a slightly increased pressure, for example up to 6 atmospheres. When the purification process is carried out as a liquid-liquid extraction, higher pressures than 6 atmospheres e.g., up to 15 atmospheres, may be advantageous.

The advantage of using the said solvents according to the invention resides in the fact that loss of diolefines is kept extremely low. Moreover, there is no risk of readily decomposable compounds being formed which can give rise to explosions.

The process will now be further described with reference to the accompanying diagrammatic drawing, but the invention is not limited to the particular apparatus shown.

The conjugated diolefine which contains acetylene and allenes of the same empirical formula and which is to be freed from impurities is introduced in gaseous phase through a pipe 1 into the lower end of an absorber 2 and a selective solvent flows in at the top of the scrubbing tower through a pipe 3. The diolefine freed from the said acetylenes and allenes is withdrawn at the top of absorber 2 through a pipe 4. To remove solvent vapor, the diolefine may be washed with water or with liquid diolefine supplied through a pipe 5 to a washing zone 6, the wash liquid then being supplied to absorber 2. The solvent laden with the said allenes and acetylenes leaves the absorber 2 at the bottom through a pipe 7 and is passed to the top of a countercurrent stripper 8. The gas mixture occurring at the top of countercurrent stripper 8 and consisting of the diolefine and part of the said acetylenes and allenes, is returned through a pipe 9 to absorber 2 at the bottom thereof together with the diolefine to be purified. The said acetylenes and allenes are withdrawn from countercurrent stripper 8 through a lateral outlet pipe 10 at a suitable height. To avoid losses of solvent, this gas stream is passed through a water washing unit 11 to which water is fed through a pipe 12. The wash water is supplied through a pipe 14 to the bottom of countercurrent stripper 8. When using acetonitrile, it is preferred to free the gas stream removed through outlet 10 from acetonitrile by washing it with water, and to recover the acetonitrile by distillation. It is convenient to mix the gas mixture occurring at 13 with some combustible waste gas and flare it. At the bottom of countercurrent stripper 8 the solvent is heated up by heating means 15 and thus freed from all gaseous compounds. After having been cooled, the solvent may be supplied through pipe 3 to absorber 2.

Absorber 2 and countercurrent stripper 8 may be operated at the same pressure. In this case the two columns may be combined in a single column. If, however, countercurrent stripper 8 is operated at a lower pressure than absorber 2, the gas mixture supplied from the top of countercurrent stripper 8 to the bottom of absorber 2 is compressed to the pressure of the absorber 2 by means of a compressor.

The following examples given with reference to the drawing, will further illustrate, but do not limit, the invention.

*Example 1*

A crude butadiene which has been isolated from a fraction obtained in a cracking operation, and containing about 1000 p.p.m. of 1,2-butadiene, 500 p.p.m. of 1-butyne and 100 p.p.m. of 2-butyne is introduced at the rate of 3 m.$^3$/h. into the bottom of packed tower 2 having an internal width of 150 mm. and a height of 6 m. N-methylpyrrolidone with 5% by weight of water as selective solvent is supplied to the top of tower 2 at the rate of 100 liters/h. The temperature of the solvent is +20° C. The pressure in the tower is 1.05 atmospheres absolute. From the top of the tower a butadiene can be withdrawn which contains only 45 to 50 p.p.m. of 1,2-butadiene, while other impurities cannot be detected by gas chromatography. The laden selective solvent is supplied to a second tower 8. This is also a packed tower having a diameter of 150 mm. and a length of 8 meters. Butynes and 1,2-butadiene are withdrawn from this tower at a point above the lower fifth thereof and washed with water to avoid loss of solvent. The wash water is supplied to the bottom of tower 8. The temperature at the bottom of tower 8 is kept at 140° to 145° C. The content of 1,3-butadiene in the gas mixture discharged from tower 8 and containing substantial amounts of butynes and 1,2-butadiene is 30% so that the loss of butadiene is less than 0.5% of the butadiene introduced.

The same results are achieved by using as selective solvent, instead of N-methylpyrrolidone, either pyrrolidone or formylpyrrolidine. The temperature at the bottom of tower 8, in these cases, is kept at the boiling point of the solvent used.

*Example 2*

A crude 1,3-butadiene which has been isolated from a fraction obtained in a cracking operation and containing about 500 p.p.m. of 1,2-butadiene, 250 p.p.m. of 1-butyne and 50 p.p.m. of 2-butyne is introduced at the rate of 3 m.$^3$/h. into the bottom of packed tower 2 having an internal width of 150 mm. and a height of 6 m. Furfurol saturated with water at room temperature is supplied as selective solvent to the top of tower 2 at the rate of 100 liters/h. The temperature of the solvent is +20° C. The pressure in the tower is 1.05 atmospheres absolute. From the top of the tower a 1,3-butadiene can be withdrawn which contains only 45 to 50 p.p.m. of 1,2-butadiene, while other impurities cannot be detected by gas chromatography. The laden selective solvent is supplied to a second tower 8. This is also a packed tower having a diameter of 150 mm. and a length of 8 meters. Butynes and 1,2-butadiene are withdrawn from this tower at a point above the lower fifth thereof and washed with water to avoid loss of solvent. The wash water is supplied to the bottom of tower 8. The temperature at the bottom of tower 8 is kept at 140° to 145° C. The content of 1,3-butadiene in the gas mixture discharged from tower 8 and containing substantial amounts of butynes and 1,2-butadiene is 30% so that the loss of 1,3-butadiene is less than 0.5% of the butadiene introduced.

*Example 3*

A crude 1,3-butadiene which has been isolated from a fraction obtained in a cracking operation and containing about 750 p.p.m. of 1,2-butadiene, 300 p.p.m. of 1-butyne and 75 p.p.m. of 2-butyne is introduced at the rate of 3 m.$^3$/h. into the bottom of packed tower 2 having an internal width of 150 mm. and a height of 6 m. Acetonitrile with 5% by weight of water is supplied as selective solvent to the top of tower 2 at the rate of 100 liters/h. The temperature of the solvent is +20° C. The pressure in the tower is 1.05 atmospheres absolute. From the top of the tower a 1,3-butadiene can be withdrawn which contains only 45 to 50 p.p.m. of 1,2-butadiene, while other impurities cannot be detected by gas chromatography. The laden selective solvent is supplied to a second tower 8. This is also a packed tower having a diameter of 150 mm. and a length of 8 meters. Butynes and 1,2-butadiene are withdrawn from this tower at a point above the lower fifth thereof. The temperature at the bottom of tower 8 is kept at 140° to 145° C. The content of 1,3-butadiene in the gas mixture discharged from tower 8 and containing substantial amounts of butynes and 1,2-butadiene is 30% so that the loss of 1,3-butadiene is less than 0.5% of the butadiene introduced.

Example 4

A crude isoprene which has been isolated from a fraction obtained in a cracking operation and containing about 1,200 p.p.m. of 3-methyl-1,2-butadiene, 400 p.p.m. of 1-pentyne and 50 p.p.m. of 2-pentyne is introduced at the rate of 3 m.³/h. into the bottom of packed tower 2 having an internal width of 120 mm. and a height of 10 m. N-methylpyrrolidone with 5% by weight of water is supplied as selective solvent to the top of tower 2 at the rate of 70 liters/h. The temperature of the solvent is +40° C. The pressure in the tower is 1.05 atmospheres absolute. From the top of the tower an isoprene can be withdrawn which contains only 45 to 50 p.p.m. of 3-methyl-1,2-butadiene, while other impurities cannot be detected by gas chromatography. The laden selective solvent is supplied to a second tower 8. This is also a packed tower having a diameter of 120 mm. and a length of 12 meters. Pentynes and 3-methyl-1,2-butadiene are withdrawn from this tower at a point above the lower fifth thereof and washed with water to avoid loss of solvent. The wash water is supplied to the bottom of tower 8. The temperature at the bottom of tower 8 is kept at 140° to 145° C. The isoprene content in the gas mixture discharged from tower 8 and containing substantial amounts of pentynes and 1,2-butadiene is 30% so that the loss of isoprene is less than 0.5% of the isoprene introduced.

Example 5

A crude 1,3-butadiene which has been isolated from a fraction obtained in a cracking operation and containing about 1,200 p.p.m. of 1,2-butadiene, 400 p.p.m. of 1-butyne and 50 p.p.m. of 2-butyne is introduced at the rate of 3 m.³/h. into the bottom of packed tower 2 having an internal width of 150 mm. and a height of 8 m. Butyrolactone is supplied as selective solvent to the top tower 2 at the rate of 80 liters/h. The temperature of the solvent is +20° C. The pressure in the tower is 1.05 atmospheres absolute. From the top of the tower an isoprene can be withdrawn which contains only 45 to 50 p.p.m. of 1,2-butadiene, while other impurities cannot be detected by gas chromatography. The laden selective solvent is supplied to a second tower 8. This is also a packed tower having a diameter of 150 mm. and a length of 10 meters. Butynes and 1,2-butadiene are withdrawn from this tower at a point above the lower fifth thereof and washed with water to avoid loss of solvent. The wash water is supplied to the bottom of tower 8. The temperature at the bottom of tower 8 is kept at the boiling point of the solvent (206° C.). The isoprene content in the gas mixture discharged from tower 8 and containing substantial amounts of butynes and 1,2-butadiene is 30% so that the loss of butadiene is less than 0.5% of the butadiene introduced.

The same results are achieved by using 200 liters/h. of N-p-hydroxyethyl-pyrollidone containing 5% by weight of water instead of butyrolactone and using as column 2 with a height of 10 m. and as column 8 a column with a height of 15 m. The temperature at the bottom of tower 8 should be maintained at 150 to 160° C., i.e., the boiling point of the solvent mixture.

We claim:
1. A process for purifying a conjugated 1,3-diene with 4-5 carbon atoms in a hydrocarbon mixture which comprises passing a hydrocarbon mixture consisting essentially of a conjugated 1,3-diene with 4-5 carbon atoms in admixture with up to 5% by weight of an alkyne with 4-5 carbon atoms and 1,2-alkadiene with 4-5 carbon atoms, said alkyne and said alkadiene in said hydrocarbon mixture having the same number of carbon atoms and hydrogen atoms per molecule as the number of carbon atoms and hydrogen atoms per molecule of said conjugated 1,3-diene, at a temperature from −10° to +150° C. and at a pressure of 1-15 atmospheres countercurrently and in intimate contact with a liquid stream of a selective solvent selected from the group consisting of furfural having a water content of 4.5% by weight, acetonitrile having a water content of 5-15% by weight, a lactam with 4-5 carbon atoms in the lactam ring and having a water content of 5-10% by weight, a lactone with 4-5 carbon atoms in the lactone ring and having a water content of 5-10% by weight, an N-alkyl lactam with 4-5 carbon atoms in the lactam ring and 1-4 carbon atoms in the alkyl group and having a water content of 5-10% by weight, an N-hydroxyalkyl lactam with 4-5 carbon atoms in the lactam ring and 1-4 carbon atoms in the hydroxyalkyl group and having a water content of 5-10% by weight, and an N-acylated cyclic amine with 4-5 carbon atoms and a nitrogen atom in the cyclic ring with 1-3 carbon atoms in the acyl group and having a water content of 5-10% by weight, thereby selectively extracting from said hydrocarbon mixture said alkyne and said 1,2-alkadiene, and recovering after said intimate contact of said hydrocarbon mixture and said selective solvent the conjugated 1,3-diene component of said hydrocarbon mixture in purified form.

2. A process as claimed in claim 1 wherein essentially all of said alkyne is selectively extracted by said selective solvent, whereby the recovered conjugated 1,3-diene is essentially free of detectable alkyne.

3. A process as claimed in claim 1 wherein said selective solvent is said N-alkyl lactam with 4-5 carbon atoms in the lactam ring and 1-4 carbon atoms in the alkyl group and having a water content of 5-10% by weight.

4. A process as claimed in claim 1 wherein said selective solvent is furfural with a water content of 4.5% by weight.

5. A process as claimed in claim 1 wherein said solvent is acetonitrile with a water content of 5-15% by weight.

6. A process as claimed in claim 1 wherein said selective solvent is N-methylpyrrolidone with a water content of 5-10% by weight.

7. A process as claimed in claim 1 wherein said hydrocarbon mixture is passed in the vapor phase countercurrently to said liquid stream of said selective solvent and said hydrocarbon mixture vapor phase is scrubbed by said liquid stream of said selective solvent.

References Cited by the Examiner

UNITED STATES PATENTS

| 2,366,361 | 1/1945 | Semon et al. | 260—681.5 |
| 2,415,006 | 1/1947 | Hatchmuth | 260—681.5 |
| 2,664,997 | 1/1954 | Eck | 260—677 |
| 2,961,473 | 11/1960 | Ray et al. | 260—681.5 |
| 3,075,025 | 1/1963 | Henke et al. | 260—681.5 |

FOREIGN PATENTS

| 870,380 | 6/1961 | Great Britain. |

DELBERT E. GANTZ, *Primary Examiner.*

PAUL M. COUGHLAN, ALPHONSO D. SULLIVAN,
*Examiners.*